United States Patent [19]

Yamada et al.

[11] Patent Number: 4,509,592
[45] Date of Patent: Apr. 9, 1985

[54] PLATE TYPE EVAPORATOR

[75] Inventors: Ken'ichi Yamada; Hiroyuki Sumitomo; Akira Horiguchi; Kenzo Masutani, all of Osaka, Japan

[73] Assignee: Hisaka Works, Ltd., Osaka, Japan

[21] Appl. No.: 63,403

[22] Filed: Aug. 3, 1979

[30] Foreign Application Priority Data

Jan. 18, 1979 [JP] Japan .................................. 54-5158

[51] Int. Cl.³ .............................................. F28F 3/04
[52] U.S. Cl. ...................................... 165/166; 62/527
[58] Field of Search ...................... 165/166, 167, 170; 62/527

[56] References Cited

U.S. PATENT DOCUMENTS 1,775,819  9/1930  Fischer et al. ...................... 165/170
2,361,691  10/1944  Jendrassik .......................... 165/166

FOREIGN PATENT DOCUMENTS 36013   5/1926  Denmark ........................... 165/170
31972   3/1962  Finland ............................. 165/170
178610  3/1962  Sweden ............................ 165/170

Primary Examiner—Sheldon J. Richter
Attorney, Agent, or Firm—Armstrong, Nikaido, Marmelstein & Kubovcik

[57] ABSTRACT

A plate type evaporator comprising a plurality of vertically extending plate elements assembled face-to-face to define therebetween alternate channels for a heating medium and for a liquid to be evaporated. In order to accelerate the nuclear boiling of the liquid in the liquid channels, the heat transfer surface of each plate element has a plurality of vertically extending transversely spaced ridges projecting toward the associated liquid channel, such ridges being in contact with the heat transfer surface of the opposed plate element to provide areas of contact assisting in the evolution of vapor bubbles and divide the liquid channel into narrow sections assisting in the generation of vapor, such sections also assuring that even in deeper places in the liquid channel, vapor bubbles will be generated without yielding to the liquid pressure; alternatively, each plate element has a porous layer formed on its heat transfer surface facing the liquid channel. These heat transfer constructions permit attainment of even higher boiling heat transfer if the liquid in the liquid channels is caused to circulate.

1 Claim, 5 Drawing Figures

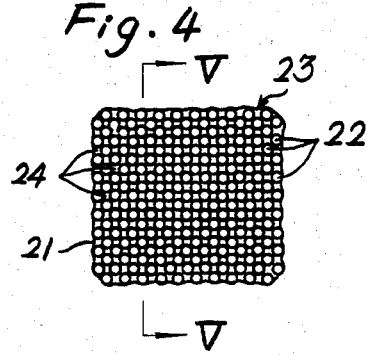
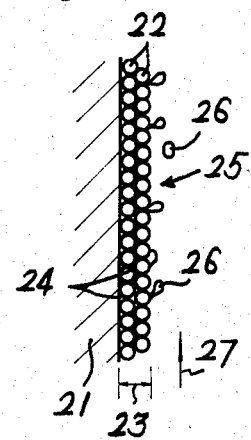
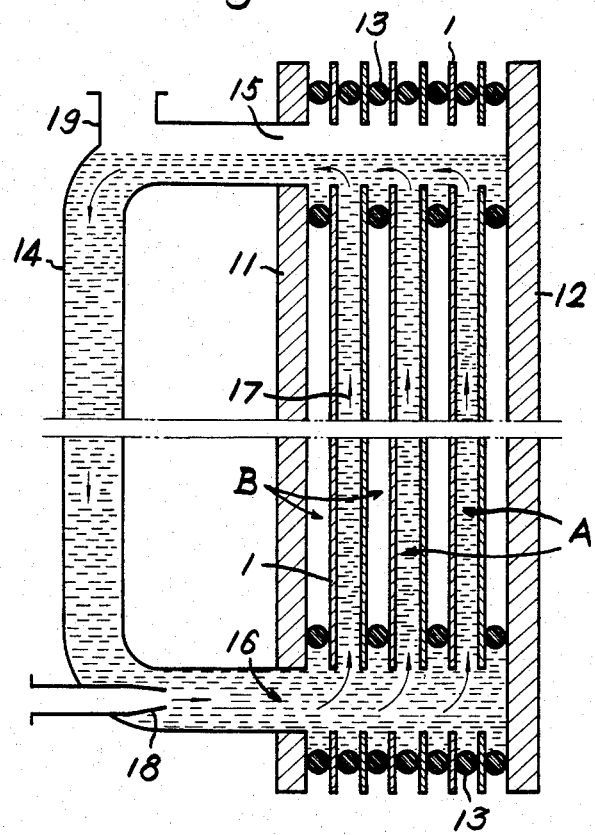

PLATE TYPE EVAPORATOR

BACKGROUND OF THE INVENTION

1. Field of the Invention

The present invention relates to a plate type evaporator.

2. Description of the Prior Art

Generally, in a plate type evaporator, alternate channels for a liquid to be evaporated and a heating medium are defined between a plurality of vertically extending plate elements assembled face-to-face, wherein the heating medium is fed to the heating medium channels while the liquid to be evaporated is fed to the liquid channels, so that indirect heat exchange takes place therebetween through the plate elements. As a result of such heat exchange, the heating medium if it is in gaseous state, is condensed, with the latent heat of condensation being used to evaporate the liquid in the adjacent channels through the plate elemets. Thus, the heat transfer is effected while the liquid is boiling on the heat transfer surfaces of the plates.

When boiling begins in a saturated liquid, vapor bubbles will be generated with the dirt and air particles contained in said liquid serving as nuclei. In the case of so-called pool boiling in a liquid at rest, bubbles are continuously evolved from particular points on the heat transfer surface until the temperature difference between the heat transfer surface and the saturated liquid reaches a certain value. The points of evolution of bubbles on the heat transfer surface are called the nuclei of boiling and the boiling in the described state is called nuclear boiling. It is known that in nuclear boiling, the bubbles evolved act to stir the heated liquid in the channel to accelerate the boiling heat transfer.

When the heat transfer surfaces of the plate elements are flat, bubbles can hardly be evolved at the lower ends of the liquid channels because of a relatively high pressure due to the potential heads, so that it is impossible to fully achieve the effect of accelerating the generation of vapor which can be brought about by the evolution of bubbles stirring the liquid.

In this type of evaporators, various expedients have been adopted to improve the evaporation heat transfer coefficient in order to increase the efficiency of evaporation. For example, such expedients include a heat transfer surface formed with corrugations, a heat transfer surface provided with a layer of porous material, etc. In the former, the heat transfer surface is formed with vertically extending corrugations to provide therealong thick and thin regions in the flow of a fluid to be heated so that the portion of the liquid in the thick regions where heat is concentrated is caused to positively evaporate, while the portion of the liquid in the thin regions, after being heated, is allowed to flow to be added to the thick regions which are evaporating, to thereby increase the efficiency. The latter expedient is intended to cause the nuclear boiling of the liquid in the pores of the porous layer on the heat transfer surface so as to efficiently evaporate the liquid.

However, each expedient is designed only to provide a region for easy heat transfer and concentrate heat in said region so as to produce vapor concentratedly at said region. In other words, the vapor generated grows to a certain degree and leaves the heat transfer surface by the action of its buoyancy, but since such leaving is effected in a stationary state, the time from the time bubbles are evolved until they leave the heat transfer surface is prolonged. As a result, the bubbles remain between the heat transfer surface and the liquid until they leave the latter, so that they cut off the transfer of heat therebetween, thereby lowering the heat transfer coefficient. This problem becomes more serious particularly in the case of a porous heat transfer surface. That is to say, such porous heat transfer surface is intended to accelerate the evolution of bubbles by causing the nuclear boiling of the liquid in the pores, as described above, but undesirably, the bubbles evolved in the pores collide with the liquid flowing into the spaces vacated by the bubbles when they leave the pores, so that the movement of the bubbles is slowed down. This means that the period of time the bubbles cut off the transfer of heat between the liquid and the heat transfer surface is prolonged, thereby lowering the heat transfer coefficient. As a result, it is impossible to fully exhibit the effect of accelerating the evolution of bubbles which features a porous surface.

SUMMARY OF THE INVENTION

An object of the present invention is to provide a novel ebullition heat transfer surface construction for plate type evaporators which is capable of accelerating the evolution of bubbles by nuclear boiling.

A plate type evaporator according to the invention comprises a plurality of plate elements, each plate element having a plurality of vertically extending ridges transversely spaced and projecting toward the associated channel for a liquid to be evaporated, said ridges abutting against the surface of the opposed plate element to divide the liquid channel into a plurality of narrow sections where evaporation can take place with ease, the areas of contact between said ridges and the associated plate surface facilitating the evolution of bubbles. Even in the lower regions of the channels where boiling hardly occurred owing to the pressures due to the potential heads of the liquid, nuclear boiling is enhanced and, moreover, since the bubbles evolved grow while ascending a long distance, the unevaporated portion of the liquid is stirred to increase the evaporation accelerating effect. Thus, a heat transfer surface which is satisfactory in all respects can be obtained.

In order to assure higher heat transfer, the invention also provides a plate type evaporator comprising a return path connecting a vapor outlet and an evaporation liquid inlet and serving as a circulation passageway for the evaporation liquid to circulate therethrough, and a liquid supplying nozzle provided in said circulation passageway for resupplying liquid to compensate for the amount evaporated, wherein the natural circulation of liquid is caused by the pumping effect brought about by evaporation and besides this the rate of circulation of liquid is increased by injecting a resupply of liquid by said liquid supplying nozzle whereby the liquid is caused to flow along the heat transfer surface.

In addition, if the heat transfer surface of the plate has particles melt-blasted or bonded thereto to form a porous layer having labyrinth spaces therein, the heat transfer coefficient for nuclear boiling is improved as compared with a smooth-surfaced heat transfer plate, so that an efficient evaporator can be provided.

These and other features will become more apparent from the following description to be given with reference to the accompanying drawings.

BRIEF DESCRIPTION OF THE DRAWINGS

FIGS. 1 and 2 show the heat transfer surface construction of an evaporator according to the invention, wherein FIG. 1 is a cross-sectional view of heat transfer plates assembled face-to-face, and FIG. 2 is a front view of a heat transfer plate taken along the line II—II of FIG. 1;

FIG. 3 is a longitudinal section of a plate type evaporator having heat transfer plates shown in FIGS. 1 and 2; and FIGS. 4 and 5 show another embodiment of the heat transfer surface construction according to the invention, wherein FIG. 4 is a fragmentary front view of a porous heat transfer surface, and FIG. 5 is a section taken along line V—V of FIG. 4.

DESCRIPTION OF THE PREFERRED EMBODIMENTS

Figure 1:
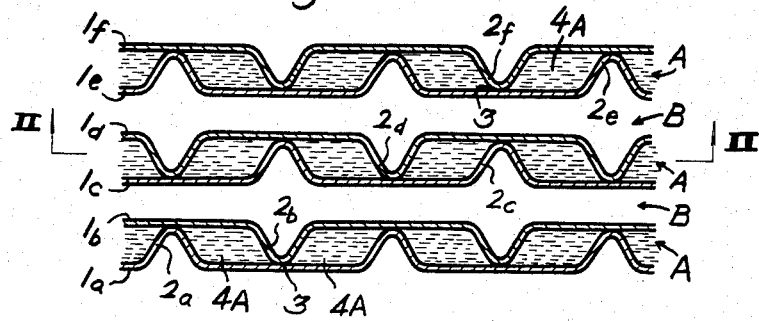
Figure 2:
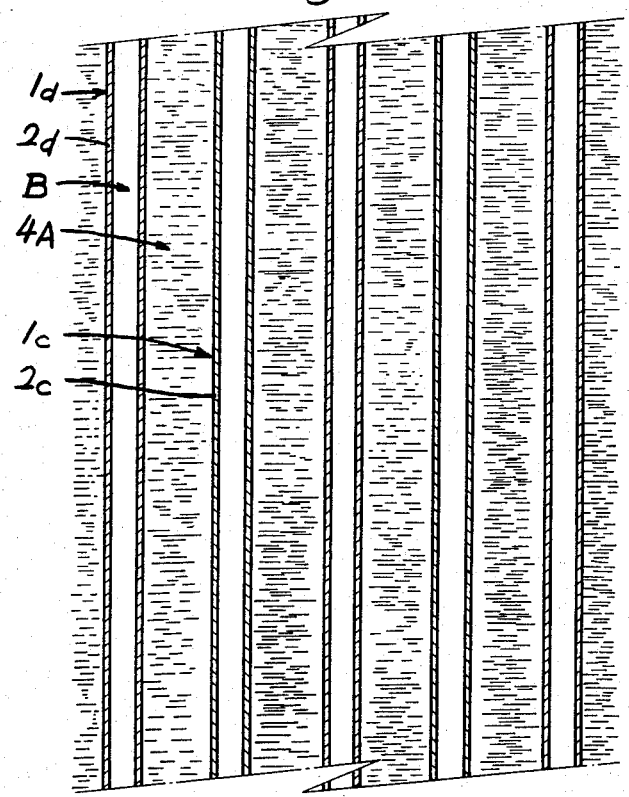

Referring to FIGS. 1 and 2, heat transfer plates are indicated by $1a-1f$, each plate having vertically extending ridges $2a-2f$ transversely spaced apart from each other a fixed distance. FIG. 1 shows a pack of heat transfer plates assembled face-to-face to define therebetween channels A for supplying a liquid to be evaporated and channels B for supplying a heating medium, said channels A and B alternating with each other. In each heat transfer plate, the ridges 2 project toward the associated channel A. More particularly, with a pair of adjacent plates $1a$ and $1b$ taken as an example, the ridges $2a$ on one plate $1a$ are displaced, for example, ½ pitch relative to the ridges $2b$ on the other plate $1b$ so that they may abut against the flat portions between the ridges $2b$ on the other plate $1b$. Thus, the ridges $2a$ and $2b$ abut against the surfaces of the opposed plates $1a$ and $1b$ at positions indicated by 30 to divide the channel A between the plates $1a$ and $1b$ into a plurality of vertically extending and laterally separated sections 5A. The plates $1c-1f$ having ridges $2c-2f$ are arranged in the same manner, as shown. In addition, though not illustrated, between plates defining the channel B, for example, the plates $1b$ and $1c$, suitable distance pieces are provided to maintain the proper spacing therebetween necessary for the channel B.

A liquid to be evaporated is charged into the liquid channels A while a heating medium is supplied to the heating medium channels B, whereupon the liquid receives the heat of the heating medium through the plates, that is, it is heated. In this connection, it is to be noted that the regions of contact 3 between the ridges and the plate surfaces serve to assist in the formation of nuclei of boiling, so that bubbles are vigorously evolved adjacent said regions of contact 3. Since the bubbles of vapor evolved ascend a long distance along the ridges 2, they act to stir the liquid, thus accelerating the evaporation of the liquid.

FIG. 3 shows a longitudinal section of a plate type evaporator, referred to as the liquid repletion type, using the heat transfer plates shown in FIGS. 1 and 2. The numerals 11 and 12 designate frames between which heat transfer plates 1 which constitute the principal portion of the evaporator are held, and gaskets 13 are disposed between said plates 1 to define channels A and B.

When a liquid to be evaporated is charged into the liquid channels A while a heating medium is supplied to the heating medium channels B, the liquid is heated by the heating medium in the adjacent heating medium channels B. In this connection, as described above, the regions of contact 3 (FIG. 1) serve to assist in the evolution of bubbles and a large number of bubbles are evolved in the vicinity of the regions of contact 3. Since these bubbles ascend the narrow sections 4A (FIG. 1), the unevaporated liquid is stirred to have its evaporation accelerated. At the same time, the pumping action brought about by evaporation causes the natural circulation of the liquid in the liquid channel A as indicated by arrows 17 through a return path 14 through which the upper opening 15 of the liquid channels A communicates with the lower opening 16. As a result, moving heat is given to the heat transfer surfaces. Further, in order to supply liquid to compensate for the amount evaporated, the liquid supplying nozzle 18 injects liquid into the lower end of the return path 14 at any desired rate, resulting in increasing the flow rate of said natural circulation of liquid. Therefore, the rate of flow of liquid (indicated by arrows 17) along the heat transfer surfaces of the plates 1 is increased to assure high boiling heat transfer. The vapor generated is taken out through a discharge port 19 provided in the top of the evaporator.

FIGS. 4 and 5 illustrate a heat transfer plate having a porous surface which may be employed in a plate type evaporator in order to accelerate the evolution of bubbles during nuclear boiling. As illustrated, the surface of a metal plate 21 is formed with a porous layer 23 composed of a large number of particles 22. The porous layer 23 may be formed by heating the particles 22 to a suitable temperature at which the surfaces of the particles just begin to melt and blasting them to the surface of the plate 21 at high speed as by gas pressure. Alternatively, it may be formed by bonding the particles 22 to to the surface of the plate 21 by suitable adhesive means. The particles 22 may be in a single layer or in a multilayer. FIG. 5 illustrates a two-layer formation. If the surface of the plate 21 is smooth, the particles 22 can hardly be melt-bonded thereto. Thus, it is advisable to roughen the surface in advance as by sand-blasting. Labyrinth spaces 24 are thus defined in the interior of the porous layer 23, and the surface 25 is rough.

In addition, although the particles 22 are shown as spheres for the sake of clarity, they are not limited thereto, provided that spaces 24 are defined in the interior. Further, the porous layer 22 may be formed to cover the whole or a part of the surface of the plate 21.

The heat transfer plates of the construction described above are assembled face-to-face so that the side where the porous layer 22 is provided faces the channel for a liquid to be evaporated. Therefore, the liquid enters the spaces 24 in the porous layer 23 and heated by the plates 21 and the particles 22 therearound, whereby concentrated heating is effected. That is to say, nuclear boiling is caused in the spaces 24. As a result, the evolution of bubbles is accelerated, so that bubbles 26 are vigorously evolved from the surface 25 of the porous layer 23 and grow. As the bubbles 26 grow, their buoyancy increases, causing the bubbles 26 to move through the labyrinth spaces 24 to appear at the surface 25 of the porous layer, from which they are then separated by the flow of the liquid (indicated by an arrow 27) in the channel A. In brief, the bubbles 26 evolved pass through the labyrinth spaces 24 to the surface 25 and washed away downstream. The flow of the liquid in the channel A is such that particularly when the channel A is narrow, the bubbles which are evolved as accelerated by nuclear boiling and grow tend to float up to push the preceding bubbles on the downstream side, such movement of the bubbles imparting flow to the liquid. This is the so-called natural circulation phenomenon, and the evolved bubbles 26 are taken out through the discharge port 17 on the most downstream side, as in the case of the evaporator shown in FIG. 3, while the unevaporated liquid overflows to circulate to the upstream side, such streams 17 and 27 serving to forcibly separate the bubbles 26 from the surface of the porous layer 23. The same may be said of forced circulation.

Since the large number of "labyrinth exits" on the surface 25 of the porous layer are communicating with the "labyrinth paths" 24 in the interior of the porous layer 23, the liquid is entering one labyrinth exit or another at any moment immediately after a bubble has left such exit. Thus, the entering of liquid and the outflow or separation of a bubble do not interfere with each other at any labyrinth exit. Therefore, the separation of bubbles from the heat transfer surface is rapidly effected, which, coupled with the forced separation of bubbles by the flow of liquid, greatly shortens the period of time bubbles intervene between the liquid and the heat transfer surface to cut off the transfer of heat therebetween.

Further, as is apparent from the drawings, the porous layer surface 25 is a rough surface which cooperates with the flow of the liquid to stir the liquid flowing therealong, assuring the even contact of the liquid with the heat transfer surface for better heat exchange. Moreover, since this liquid stirring action shakes the bubbles on the heat transfer surface to assist in the separation of the bubbles therefrom, the heat transfer coefficient for nuclear boiling is further improved.

What is claimed is:

1. A plate type evaporator comprising a plurality of vertically extending plate elements assembled face-to-face to define therebetween alternate channels for a heating medium and for a liquid to be evaporated, each plate element being formed on its heat transfer surface with a plurality of vertically extending transversely spaced ridges projecting toward the associated liquid channel, said ridges abutting against the flat surface portions between ridges of an adjacent plate element, such places of contact serving to facilitate the evolution of bubbles, each of said liquid channels being divided by said ridges into a plurality of vertically extending sections laterally separated from each other to facilitate evaporation.

* * * * *